Patented Jan. 6, 1953

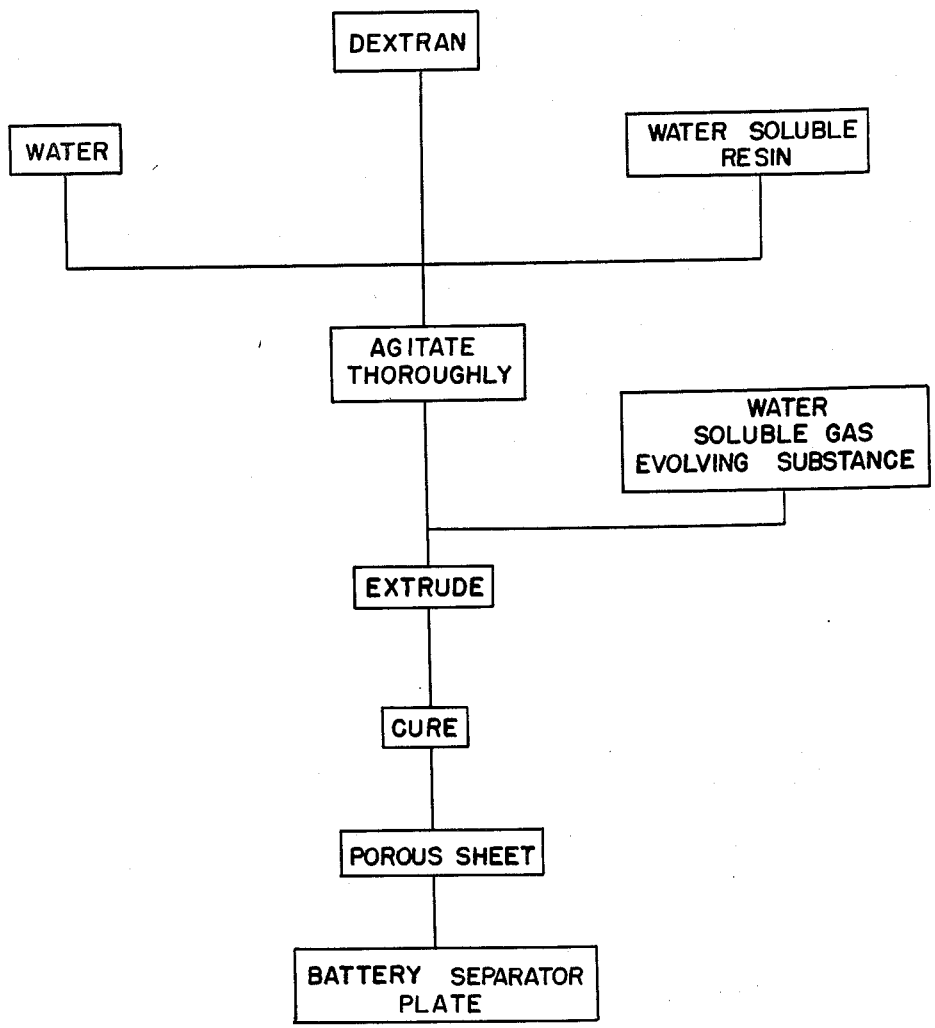

2,624,768

UNITED STATES PATENT OFFICE 2,624,768

DEXTRAN BATTERY SEPARATOR PLATE

Harry A. Toulmin, Jr., Dayton, Ohio, assignor to The Commonwealth Engineering Company of Ohio, Dayton, Ohio, a corporation of Ohio Application July 23, 1951, Serial No. 238,147

17 Claims. (Cl. 136—146)

This invention relates to battery separator plates.

Battery separator plates have been constructed of many materials and in various forms, such as wood, impregnated woods, glass fabrics and fibers, rubber, and so forth. However, the rigid requirements of battery separator plates, including high resistance to acids, high resistance to electrical conductivity and stability of physical structure have hitherto hindered the development of a completely satisfactory plate.

It is an object of this invention to provide a new and novel construction of battery separator plate which overcomes the above noted defects.

It is another object of this invention to provide an efficient and economical process for the production of a novel battery separator plate.

Thus the present invention contemplates in the preferred embodiment the employment of a high molecular weight water soluble polysaccharide, such as dextran, and an acid resistant resinous material. More particularly, in the process of invention the water soluble dextran is mixed in an aqueous solution with an acid resistant water soluble resin material and a gas evolving substance, whereafter the viscous mass is extruded into white thin continuous sheets and then cured. Upon the application of heat the gas evolving substance decomposes, creating a porosity in the resin as the same sets under the application of temperature. The product produced by this process is a hard, acid resistant, non-oxidizable, porous material.

The dextran referred to is a polysaccharide produced by the action of microorganisms on a suitable culture medium, and may be prepared by forming a mixture containing sucrose that is in the form of crude sugar, molasses or the like, together with nitrogen in the form of commercial peptone, beef extract or other similar material, and salts such as dipotassium phosphate and sodium chloride is inoculated with Leoconostoc mesenteroides or Leuconostoc dextranicum. A typical medium may contain 5 to 10% of sucrose, 0.1% of peptone, 0.2% of dipotassium phosphate and 0.1% of sodium chloride. The pH of the medium is adjusted preferably slightly on the alkaline side of neutrality.

The inoculated culture may be incubated at a temperature most favorable to the growth of the micro-organism being used. For L. mesenteroides a temperature of about 25° C. is suitable. When the fermentation has been completed the polysaccharide formed is precipitated from the culture by the addition thereto of alcohol or acetone. The precipitate may be purified by further washing with alcohol or acetone.

The dextran thus produced may be redissolved and hydrolyzed with acid and the solution fractionated by treatment with isopropyl alcohol to remove the high molecular constituents, leaving a dextran having a molecular weight in the range of 60,000 to 400,000, which is the desired range for the material utilized in the practice of this invention.

A particularly suitable water soluble resin for the practice of invention may be formed as set forth in Patent No. 2,431,375 wherein there is described an alkyd resin formed by mixing phthalic anhydride and glycerin in the molecular proportion of one mol to two mols, respectively. Alternately, the resin may be formed by employing one mol of each of the phthalic anhydride and glycerin and triethanolamine. In each of the above the mixture is heated to approximately 150 to 160° C. to effect reaction, and it is important, as stated in the patent, that the temperature at this stage be controlled below 160° C. in order to secure the water soluble resin.

Any gas evolving substance which liberates gas upon heating above room temperature, and which does not react with the dextran or resin, may be suitably employed in the mixture. Ammonium carbonate is particularly suitable for the purpose although other carbonates and bicarbonates may be employed.

The method of invention is practiced by first adding an excess of dextran to water and thoroughly mixing the same to form a fibrous mass. The alkyd resin having a concentration of solids of between about 40 and 80% in an aqueous solution is then added to the polysaccharide mass, and the same is thoroughly agitated to insure complete mixing of the ingredients. Thereafter a small amount of the ammonium carbonate may be added, preferably in a water solution, and the same completely mixed into the polysaccharide resin material. It should be noted that it is preferable to add the ammonium carbonate in the final step, as otherwise gas may be evolved due to heating of the solution of the resin and the polysaccharide. Of course the mixture may be cooled to prevent gas evolution, but the same generally is not necessary if the precaution is taken of adding the gas evolving substance in the last step.

The completely mixed mass is then extruded through a suitable pair of calender rolls which act to squeeze out water from the material and to form the mass into a thin wide sheet. This sheet is then passed directly to a curing zone having a temperature in the range of about 150 to 250° C. whereupon evolution of gas and water takes place while the resin is believed to react with the polysaccharide and to become firmly set. The resultant sheet is then cooled and will be found to consist of a hard porous material.

The invention will be more fully understood by reference to the following descriptive examples and to the accompanying flow sheet:

EXAMPLE I

*Dextran composition*

|  | Per cent by weight |
| --- | --- |
| Dextran (average molecular weight of 100,000) | 60 |
| Water | 40 |

*Resin composition*

|  | Per cent by weight |
| --- | --- |
| Water soluble phthalic anhydride-glycerin | 50 |
| Water | 50 |

The resin and dextran compositions set forth above are treated as described hereinbefore, and about 1% by weight of the total mass of ammonium carbonate is added thereto, preferably dissolved in water. The material is then treated, as described hereinbefore, to produce the battery separator plate of invention.

EXAMPLE II

*Dextran composition*

|  | Per cent by weight |
| --- | --- |
| Dextran (average molecular weight of 70,000) | 85 |
| Water | 15 |

*Resin composition*

|  | Per cent by weight |
| --- | --- |
| Reaction product of phthalic anhydride, glycerin and triethanolamine in the proportion of 1:1:1 | 65 |
| Water | 35 |

It will be noted that in this example the excess of dextran is predominant, the volume of water present being relatively low. The mass is accordingly very viscous and the time of agitation for the incorporation of the resin may accordingly be somewhat longer than is required for the composition of Example I. However, due to the reduced amount of water present, the heating time may be somewhat shorter and be governed only by the necessity of curing the resin and decomposing the ammonium carbonate, which in this instance should be present to the extent of about 2% by weight of the total composition.

It will be appreciated that the foregoing process may be readily adapted to continuous methods of producing novel sheets of the battery separator plate of invention. For example, the mass may be readily passed vertically between mating rolls which sheet out the plate, and the same may then be passed again in a vertical direction into a heating unit wherein the extruded plate is carried on a wire screen or similar material, which screen permits of ready gas evolution from both sides of the sheet during the curing.

While the mechanism of the reaction between the polysaccharide dextran and the resinous material is not completely understood, it is believed that an addition reaction occurs to form a product which is substantially acid insoluble, non-conductive electrically, and which will not shred in the battery under service conditions.

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

I claim:

1. A liquid permeable battery separator plate consisting of a thin acid resistant porous sheet composed of dextran and a polymerized resin.

2. A liquid permeable battery separator plate consisting of a thin acid resistant porous sheet composed of dextran and an alkyd resin.

3. A liquid permeable battery separator plate consisting of a thin acid resistant porous sheet composed of dextran and a water soluble alkyd resin.

4. A liquid permeable battery separator plate consisting of a thin acid resistant porous sheet comprising the heat reaction product of dextran, and alkyd resin and a gas evolving substance.

5. A liquid permeable battery separator plate consisting of a thin acid resistant porous sheet comprising the heat reaction product of dextran, a water soluble phthalic anhydride-glycerin resin and a gas evolving substance.

6. A liquid permeable battery separator plate consisting of a thin acid resistant porous sheet comprising the heat reaction product of dextran, phthalic anyhdride - glycerin - triethanolamine resin and a gas evolving substance.

7. A liquid permeable battery separator plate consisting of a thin acid resistant porous sheet comprising the heat reaction product of dextran, a water soluble alkyd resin and ammonium carbonate.

8. A process of producing a battery separator plate comprising the steps of forming an aqueous plastic mass of dextran, a water soluble acid resistant resin, and a gas evolving substance, extruding the said mass into thin sheets, and heating the said sheets.

9. A process of producing a battery separator plate comprising the steps of forming an aqueous plastic mass of dextran, a water soluble acid resistant resin, and a gas evolving substance, extruding the said mass into thin sheets, and heating the said sheets at a temperature in the range of 150 to 250° C.

10. A process of producing a battery separator plate comprising the steps of forming an aqueous plastic mass of dextran, a water soluble acid resistant alkyd resin and a gas evolving substance, extruding the said mass into thin sheets, and heating the said sheets at a temperature in the range of 150 to 250° C.

11. A process of producing a battery separator plate comprising the steps of forming an aqueous plastic mass of dextran, a water soluble phthalic anhydride-glycerin resin and a gas evolving substance, extruding the said mass into thin sheets, and heating the said sheets at a temperature in the range of 150 to 250° C.

12. A process of producing a battery separator plate comprising the steps of forming an aqueous plastic mass of dextran, a water soluble acid resistant glycerin-triethanolamine resin and a gas evolving substance, extruding the said mass into thin sheets, and heating the said sheets at a temperature in the range of 150 to 250° C.

13. A process of producing a battery separator plate comprising the steps of forming an aqueous plastic mass of a dextran having a molecular weight in the range of 60,000 to 400,000, a water soluble acid resistant glycerin-triethanolamine resin and a gas evolving substance, extruding the said mass into thin sheets, and heating the said sheets at a temperature in the range of 150 to 250° C.

14. A liquid permeable battery separator plate consisting of a thin acid resistant porous sheet comprising the reaction product of dextran having an average molecular weight of 100,000, the heat reaction product of water soluble phthalic anhydride and glycerin, and ammonium carbonate.

15. A liquid permeable battery separator plate consisting of a thin acid resistant porous sheet comprising the reaction product of dextran having an average molecular weight of 70,000, the heat reaction product of water soluble phthalic anhydride, glycerin and triethanolamine, and ammonium carbonate.

16. A liquid permeable battery separator plate consisting essentially of the reaction product of about 6 parts by weight of dextran having an average molecular weight of 100,000, and about 5 parts by weight of water soluble phthalic anhydride glycerin.

17. A liquid permeable battery separator plate consisting essentially of the reaction product of about 85 parts by weight of dextran having an average molecular weight of 70,000, and about 65 parts by weight of water soluble phthalic anhydride, glycerin and triethanolamine.

HARRY A. TOULMIN, Jr.

REFERENCES CITED

The following references are of record in the file of this patent:

UNITED STATES PATENTS

| Number | Name | Date |
|---|---|---|
| 2,315,366 | Daley et al. | Mar. 30, 1943 |
| 2,421,831 | Cooper | June 10, 1947 |